United States Patent
Rostami et al.

(10) Patent No.: US 11,159,608 B2
(45) Date of Patent: Oct. 26, 2021

(54) METHOD AND CONTROL NODE FOR MANAGING CLOUD RESOURCES IN A COMMUNICATIONS NETWORK

(71) Applicant: Telefonaktiebolaget LM Ericsson (publ), Stockholm (SE)

(72) Inventors: Ahmad Rostami, Solna (SE); Paolo Monti, Stockholm (SE); Carlos Natalino Da Silva, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 16/489,695

(22) PCT Filed: Mar. 6, 2017

(86) PCT No.: PCT/SE2017/050203
§ 371 (c)(1),
(2) Date: Aug. 28, 2019

(87) PCT Pub. No.: WO2018/164610
PCT Pub. Date: Sep. 13, 2018

(65) Prior Publication Data
US 2020/0014747 A1    Jan. 9, 2020

(51) Int. Cl.
*H04L 29/08* (2006.01)
*H04L 29/06* (2006.01)

(52) U.S. Cl.
CPC ........ *H04L 67/1008* (2013.01); *H04L 67/101* (2013.01); *H04L 67/1029* (2013.01);
(Continued)

(58) Field of Classification Search
CPC ........................................... H04L 2029/06054
(Continued)

(56) References Cited

U.S. PATENT DOCUMENTS

2002/0095399 A1\*  7/2002  Devine ................. G06F 16/958
2005/0102393 A1    5/2005  Murray et al.
(Continued)

FOREIGN PATENT DOCUMENTS

WO          03009157 A1      1/2003

OTHER PUBLICATIONS

Ahmed J., et al., "Hybrid Survivability Schemes Achieving High Connection Availability With a Reduced Amount of Backup Resources [Invited]," Journal of Optical Communications and Networking, 2013 Optical Society of America, vol. 5 (10), Oct. 23, 2013, pp. A152-A161.

(Continued)

*Primary Examiner* — Wing F Chan
*Assistant Examiner* — Leon Y Tseng
(74) *Attorney, Agent, or Firm* — NDWE LLP

(57) ABSTRACT

A method and control node for managing cloud resources in a communications network for a client being served by a primary data center holding service data associated with a cloud service being executed for the client in the primary data center. A first backup data center having free processing and storage resources for the cloud service, is selected based on usage of links between a source node associated with the client and the first backup data center. The service data is then saved in the first backup data center, thereby enabling the cloud service to be recovered in the first backup data center. If the usage of links in potential communication paths between the source node and the first backup data center exceeds a link usage threshold, the saved service data may be transferred from the first backup data center to a second backup data center.

15 Claims, 9 Drawing Sheets

(52) U.S. Cl.
CPC ...... *H04L 67/1034* (2013.01); *H04L 67/1097* (2013.01); *H04L 2029/06054* (2013.01)

(58) Field of Classification Search
USPC .......................................................... 709/226
See application file for complete search history.

(56) References Cited

U.S. PATENT DOCUMENTS

2010/0332401 A1\* 12/2010 Prahlad ............... H04L 63/0428
705/80
2021/0011813 A1\* 1/2021 Zhang ................... H04W 12/69

OTHER PUBLICATIONS

Develder C., et al., "Joint Dimensioning of Server and Network Infrastructure for Resilient Optical Grids/Clouds," IEEE/ACM Transactions on Networking, vol. 22 (5), Oct. 21, 2013, pp. 1-16.
International Search Report and Written Opinion for Application No. PCT/SE2017/050203, dated Jul. 4, 2017, 11 pages.
Natalino C., et al., "Restoration in Optical Cloud Networks with Relocation and Services Differentiation," 2016 IEEE/Optical Society of America, Journal of Optical Communications and Networking, vol. 8 (2), Feb. 2016, pp. 1-10.
International Preliminary Report on Patentability, PCT App. No. PCT/SE2017/050203, dated Sep. 19, 2019, 9 pages.

\* cited by examiner

Restoration + relocation:

Protection:

Connectivity restoration:

Connectivity + CPU restoration:

METHOD AND CONTROL NODE FOR MANAGING CLOUD RESOURCES IN A COMMUNICATIONS NETWORK

CROSS-REFERENCE TO RELATED APPLICATIONS

This application is a National stage of International Application No. PCT/SE2017/050203, filed Mar. 6, 2017, which is hereby incorporated by reference.

TECHNICAL FIELD

The present disclosure relates generally to a method and a control node, for managing cloud resources in a communications network for a client being served by a primary data center.

BACKGROUND

In the field of cloud-implemented services, resources for processing, storing and communication of data are basically hired and used temporarily for execution of a cloud service in a communications network. When the service is finished, the used resources are released to become available for other services and clients. Such cloud resources may be deployed in multiple data centers which are typically attached to the communications network at various locations. When a cloud service is executed for a client, the client is served by such a data center which communicates various service data with a source node associated with the client using suitable switches and links to form a communication path in the network.

In this description, the term "cloud service" is used for short to represent any service that is executed for a client by means of processing and storage resources in a data center which is typically selected to provide efficient and reliable processing and communication of the service data over the communications network. The communications network discussed herein may be any type of network, e.g. a wireless, fixed, public and/or private network, using any protocols and standards for communication. Further, a "source node" denotes a communication node attached to the communications network and which is basically controlled by the client which could be a person or an application. The source node may e.g. be a mobile device, a Machine-to-Machine device, or other communication equipment, and this disclosure is not limited to any particular type of client or source node.

As indicated above, when the client requests for a cloud service requiring a certain amount of resources, a data center is selected having enough available processing and storage resources that can be allocated to the client for the service. The data center must also be located so that a useful communication path can be established in the network between the client's source node and the data center.

However, a failure may sometimes occur during execution of a cloud service such as when the used cloud resources or communication means become faulty in some way, resulting in disruption of the service. There are some solutions available to enable the service to be recovered after such a disruption has occurred. One known approach to address such failures is referred to as "restoration" which means that an affected service is recovered using alternative servers and/or paths after a failure occurs. One drawback of this approach is that it cannot be guaranteed that service recovery, i.e. "survivability", will be successful, for example if a failure occurs at a time when the affected data center is highly loaded and does not have the required capacity and resources available to re-establish the failed service, or when there are not enough resources in the network to connect the client's source node with an alternative data center.

To ensure that the service recovery is successful, it has been proposed to combine service relocation and restoration, referred to as "restoration+relocation". In this approach, if a service is affected by a failure and the data center hosting the service does not have enough resources to recover the service, the service can be recovered by migrating it to another data center having enough capacity and resources to host the service, and also providing a useful and non-congested communication path to the source node. This approach increases the survivability of the cloud services, although at a cost of substantial service down-time due to the service migration. An example of this approach is illustrated in FIG. 1A where a first data center 104, hosting a cloud service for a source node 100 of a client 100A over a communications network 102, is subjected to some failure such that the first data center 104 can no longer host the service. The cloud service and its associated service data are then relocated to another data center 106 and the source node 100 will start to communicate with the second data center 106 instead of the first data center 104, as indicated by arrows.

Another approach for survivability of cloud services is to use a scheme referred to as "protection", where extra resources for CPU (Central Processing Unit), storage and data transport are reserved in advance, e.g. for specific sensitive services, to guarantee 100% recovery of services in case of failure. Although the protection scheme can achieve the best performance in terms of service availability and survivability, this approach is very resource inefficient and costly, particularly when used for many conventional services, since a protected service would require allocation of at least two times more resources than what the service can consume.

FIG. 1B illustrates an example of the protection scheme where a used data center 104 allocates a first set of resources 104A for execution of the service and also reserves a second equal set of resources 104B that are thereby made available in case of failure in the first set of resources 104A. As a result, only set 104A will be utilized but not set 104B unless a failure occurs, which is a waste of resources. Further, this approach does not provide protection in case of failure of the entire data center or in a communication path thereto, unless the second set 104B is reserved in another data center to which a communication path is also reserved.

SUMMARY

It is an object of embodiments described herein to address at least some of the problems and issues outlined above. It is possible to achieve this object and others by using a method and a control node as defined in the attached independent claims.

According to one aspect, a method is performed by a control node for managing cloud resources in a communications network for a client being served by a primary data center holding service data associated with a cloud service being executed for the client in the primary data center. In this method, the control node selects a first backup data center having free processing and storage resources for the cloud service, based on usage of links between a source node associated with the client and the first backup data center. The control node further saves said service data in the first backup data center, thereby enabling the cloud service to be recovered in the first backup data center in case of service failure at the primary data center.

According to another aspect, a control node is arranged to manage cloud resources in a communications network for a client being served by a primary data center holding service data associated with a cloud service being executed for the client in the primary data center. The control node is configured to select a first backup data center having free processing and storage resources for the cloud service, based on usage of links between a source node associated with the client and the first backup data center. The control node is also configured to save said service data in the first backup data center, thereby enabling the cloud service to be recovered in the first backup data center in case of service failure at the primary data center.

The above method and control node may be configured and implemented according to different optional embodiments to accomplish further features and benefits, to be described below. In the above method and control node it is an advantage that the service data will already be present in the backup data center in case the primary data center would no longer be capable of executing the cloud service. This way, there will thus be no delay caused by waiting for the service data to be transferred from the primary data center to the backup data center.

A computer program is also provided which comprises instructions which, when executed on at least one processor, cause the at least one processor to carry out the method described above. A carrier containing the above computer program is further provided, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to improve efficiency and survivability for employing a backup data center for a cloud service which is served by a primary data center in communication with a source node of a client. In this solution, a first backup data center is selected based on usage of links, e.g. in at least one potential communication path, between the source node and the first backup data center, to ensure that those links are not overloaded so that the communication between the source node and the first backup data center can take place without excessive delay or failure.

In addition, service data is proactively saved in the first backup data center so that the cloud service can easily and rapidly be recovered in the first backup data center in case of service failure at the primary data center, for whatever reason. This precaution occupies a certain amount of extra storage resources in the first backup data center but storage resources are generally much less costly than processing resources. Thereby, the survivability of the cloud service can be improved without requiring reservation of any extra processing resources in the first backup data center.

Some examples of how the solution may be realized will now be described in terms of actions performed by a control node which is operative to allocate resources in data centers and in the communications network for execution of cloud services for clients in the communications network. The term "control node" is thus used herein to represent a functional entity that is capable of allocating resources in data centers for cloud services, and of obtaining knowledge about performance and usage of connectivity resources such as switches, links and communication paths in the network. Information about the usage of connectivity resources may be obtained from a network controller or the like. The described control node could also be referred to as an orchestrator or a cloud service node, to mention some useful alternative terms.

An example will now be described, with reference to the flow chart in FIG. 2, of how the solution may be employed in terms of actions which may be performed by the above-mentioned control node. Some optional example embodiments that could be used in this procedure will also be described below. Reference will also be made, without limiting the described features and embodiments, to an example scenario shown in FIG. 3 including a communications network with a plurality of network nodes denoted "NW" which are connected to one another through various links to form a network topology. As indicated above, the communications network may be of any type such as wireless and fixed networks, public and private networks, etc., and any suitable protocols and standards may be employed in the network.

Figure 3:
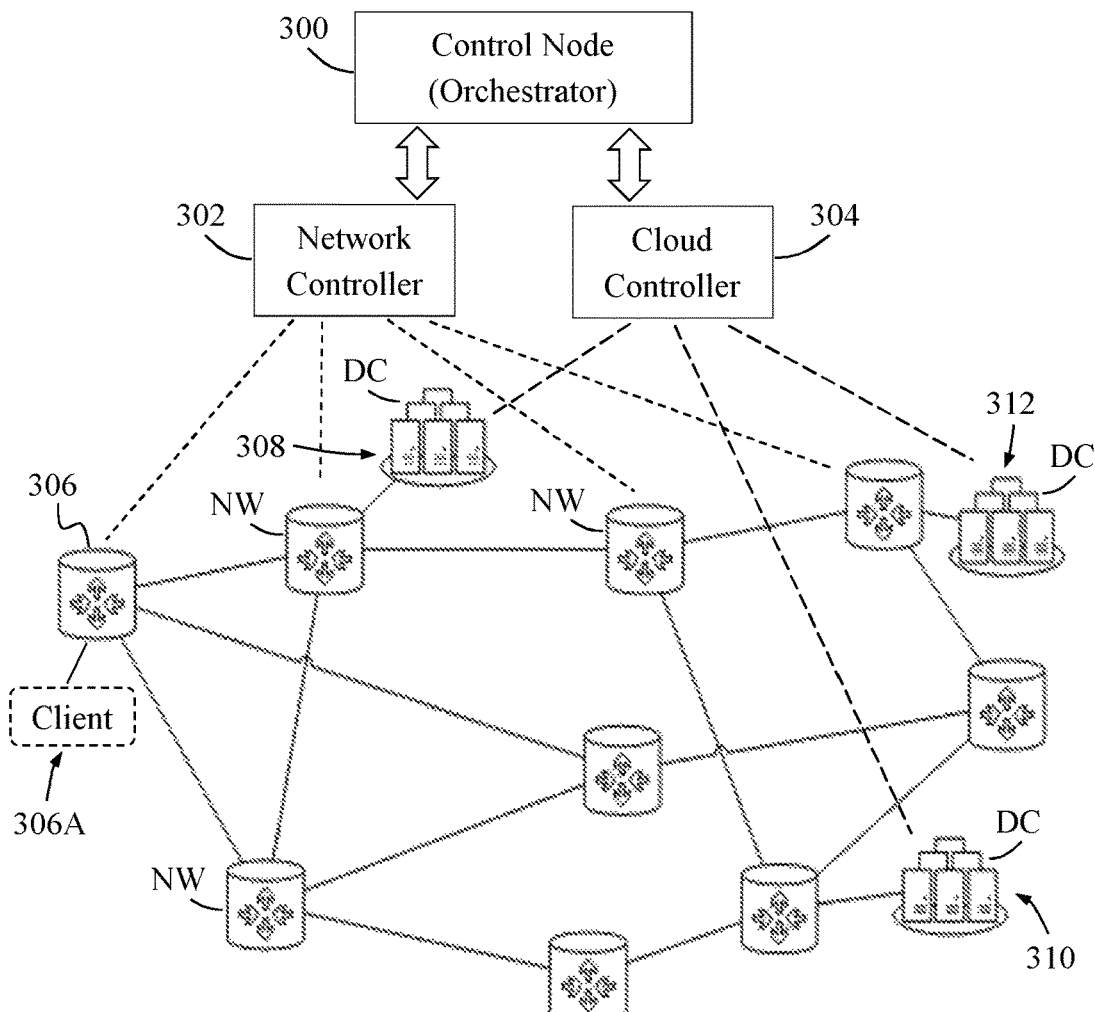
FIG. 3 is a communication scenario illustrating an example of how the solution may be realized by means of a control node, according to further possible embodiments.

FIG. 3 also illustrates that a number of data centers denoted "DC" are connected to the network at various different points, which data centers are generally capable of executing cloud services for clients. While the figure only illustrates just a few network nodes, links and data centers for simplicity, the solution and its embodiments described herein may be applied in a communications network with any number of network nodes, links and data centers. A typical network may for example comprise hundreds or thousands of network nodes and links and possibly also much more data centers than the three ones shown here. In this example, a client is schematically indicated at 306A and a source node 306 is associated with the client 306A, meaning that in this context all communication of service data can basically be regarded to terminate at the source node 306.

It is assumed that the control node 300 is able to obtain information about usage of connectivity resources in the network, e.g. from a network controller 302, and to influence operation of the data centers, e.g. through a "cloud controller" 304, in the manner described herein. The control node 300 is also able to obtain information about available processing and storage resources in the data centers, e.g. from the cloud controller 304. Depending on the implementation, the control node 300 may be integrated with the cloud controller 304 or they may be separate entities. The usage of connectivity resources in the network will be referred to herein as "usage of links" for short. If the usage of links of a communication path between the source node 306 and a serving data center is relatively high, there is a considerable risk that the communication of service data to/from the client on that path could be delayed or even hindered.

The control node 300 in this procedure is arranged to manage cloud resources in the communications network for the client 306A being served by a primary data center 308 holding service data associated with a cloud service being executed for the client in the primary data center 308. A first action 200 illustrates that the cloud service is established in the primary center 308, which may be done in a conventional manner not necessary to describe here. In a next action 202, the control node 300 selects a first backup data center 310 having free processing and storage resources for the cloud service, based on usage of links between the source node 306 associated with the client and the first backup data center 310. In this action, the control node 300 may e.g. ensure that there is at least one communication path between the source node 306 and the first backup data center 310 that has enough connectivity resources for communication without delays.

In a further action 204, the control node 300 operates to save said service data in the first backup data center 310, which may be accomplished by means of the cloud controller 304 commanding the primary data center 308 to send a copy of the service data to the first backup data center 310. The saving of service data in the first backup data center 310 may continue during execution of the service since the service data typically changes over time by generation of new service data and/or deletion of already used service data. This way the primary data center 308 and the first backup data center 310 can be synchronized with respect to service data. Thereby, the cloud service is enabled to be recovered in the first backup data center 310 in case of service failure at the primary data center 308. It should be noted that the service data is proactively saved in the first backup data center 310 well before any failure occurs at the primary data center 308, which may or may not happen during execution of the service.

It is thus an advantage that the service data will already be present in the backup data center 310 in case the primary data center 308 would no longer be capable of executing the cloud service for the client 306A, so that no delay will be caused by waiting for the service data to be transferred from the primary data center 308 to the backup data center 310 as in the conventional "restoration+relocation" solution described above. If the failure means that the entire primary data center 308 goes down, e.g. at power failure, it may not be possible to transfer the data therefrom at all once the failure has happened. Furthermore, it is not required to reserve and occupy any processing resources in the first backup data center 310 as in the conventional "protection" solution described above, only storage resources which are much less costly.

Figure 1A:
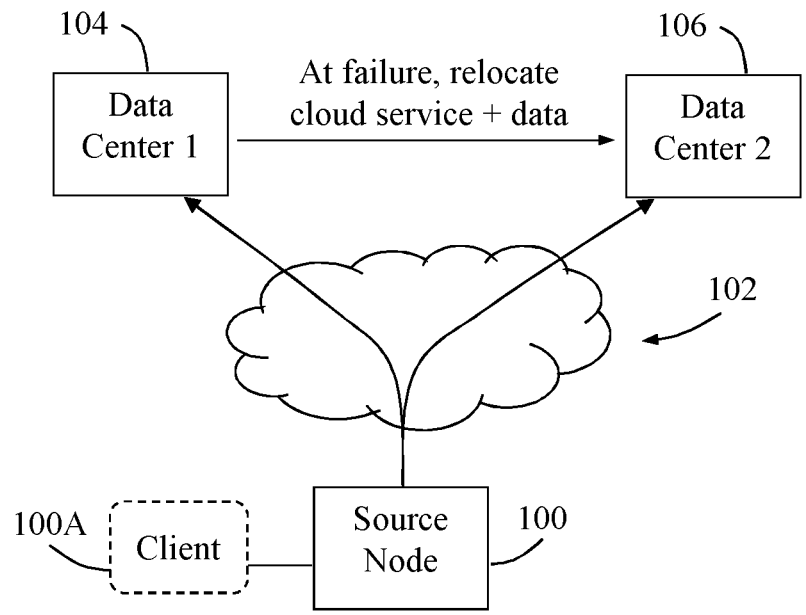
FIGS. 1A and 1B illustrate two available approaches for restoring and protecting, respectively, a cloud service in case of failure, according to the prior art.
Figure 1B:
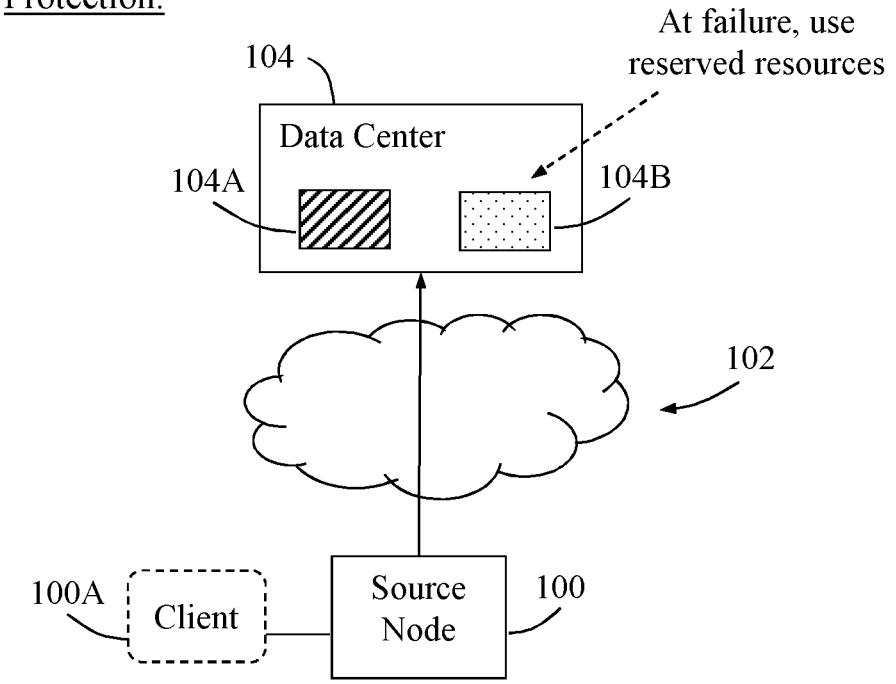
Figure 2:
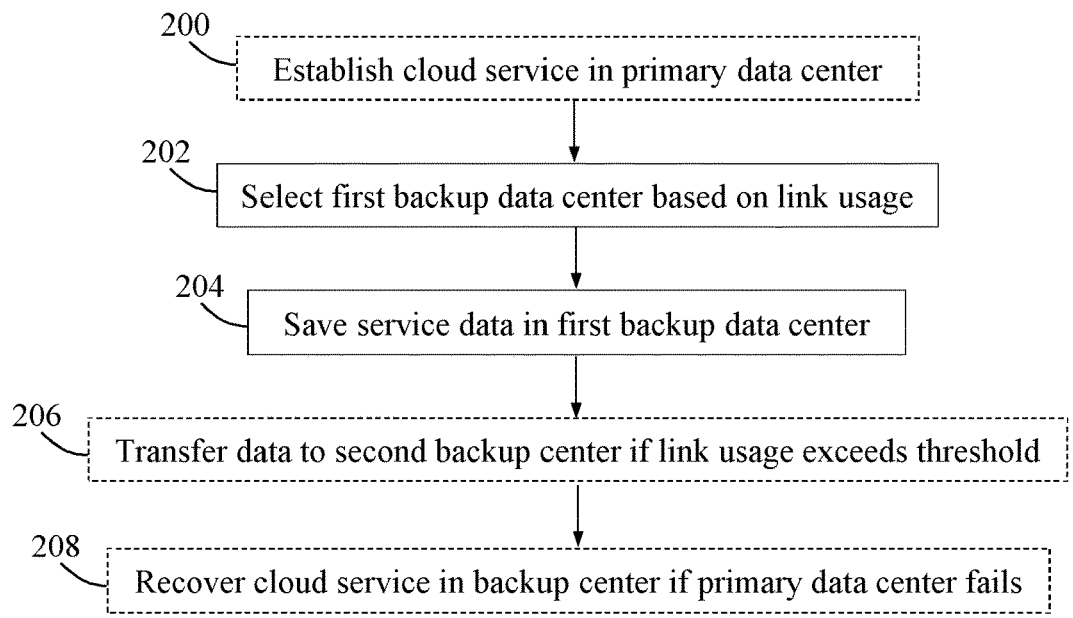
FIG. 2 is a flow chart illustrating a procedure in a control node, according to some possible embodiments.

Some further embodiments and examples of how the above procedure in FIG. 2 may be realized, will now be outlined. In one example embodiment, the first backup data center 310 may be selected when detecting that usage of links in at least one potential communication path between the source node 306 and the first backup data center 310 does not exceed a first link usage threshold. In other words, there must be at least one communication path between the source node 306 and the first backup data center 310 that has enough free connectivity resources to ensure that the communication of service data will not be delayed or hindered on that path, in case it becomes necessary to recover the cloud service in the first backup data center 310. In this context, a communication path between the source node 306 and a data center is likely to comprise a series of individual links between adjacent network nodes along the path, and this embodiment may thus ensure that there is no "bottleneck" caused by high usage in any of those links of the communication path between the source node 306 and the first backup data center 310.

During execution of the service, the usage of links between the source node 306 and the first backup data center 310 may change, e.g. due to fluctuating traffic load of the links. If the traffic load on the links, i.e. link usage, becomes too high, or if any of the links becomes faulty, the first backup data center 310 may no longer be deemed suitable due to reduced connectivity. In another example embodiment, the saved service data may be transferred from the first backup data center 310 to a second backup data center 312 when detecting that usage of links in at least a predefined number of potential communication paths between the source node 306 and the first backup data center 310 exceeds a second link usage threshold. This means that there may not be enough capacity in the network to ensure non-delayed or non-hindered communication between the source node 306 and the first backup data center 310, due to reduced connectivity. This operation is illustrated by an action 206. The second link usage threshold may be different or equal to the above-described first link usage threshold. Thereby, the cloud service is enabled to be recovered in the second backup data center 312, instead of in the first backup data center 310, in case of service failure at the primary data center 308.

In that case, another example embodiment may be that the second backup data center 312 is selected if usage of links in at least one potential communication path between the source node 306 and the second backup data center 312 does not exceed a third link usage threshold and the second backup data center 312 has free processing and storage resources needed for executing the cloud service. Thereby, it may be ensured that there is at least one communication path between the source node 306 and the second backup data center 312 that has enough free connectivity resources to enable non-delayed or non-hindered communication of service data, in case it would be necessary to recover the cloud service in the second backup data center 312. The third link usage threshold may be different or equal to the above-described second link usage threshold. A final action 208 in FIG. 2 illustrates that in case of failure at the primary data center 308, the ongoing cloud service can be recovered in the backup center 310 or 312 where the service data is currently held, which depends on whether action 206 has been performed or not.

Figure 8:
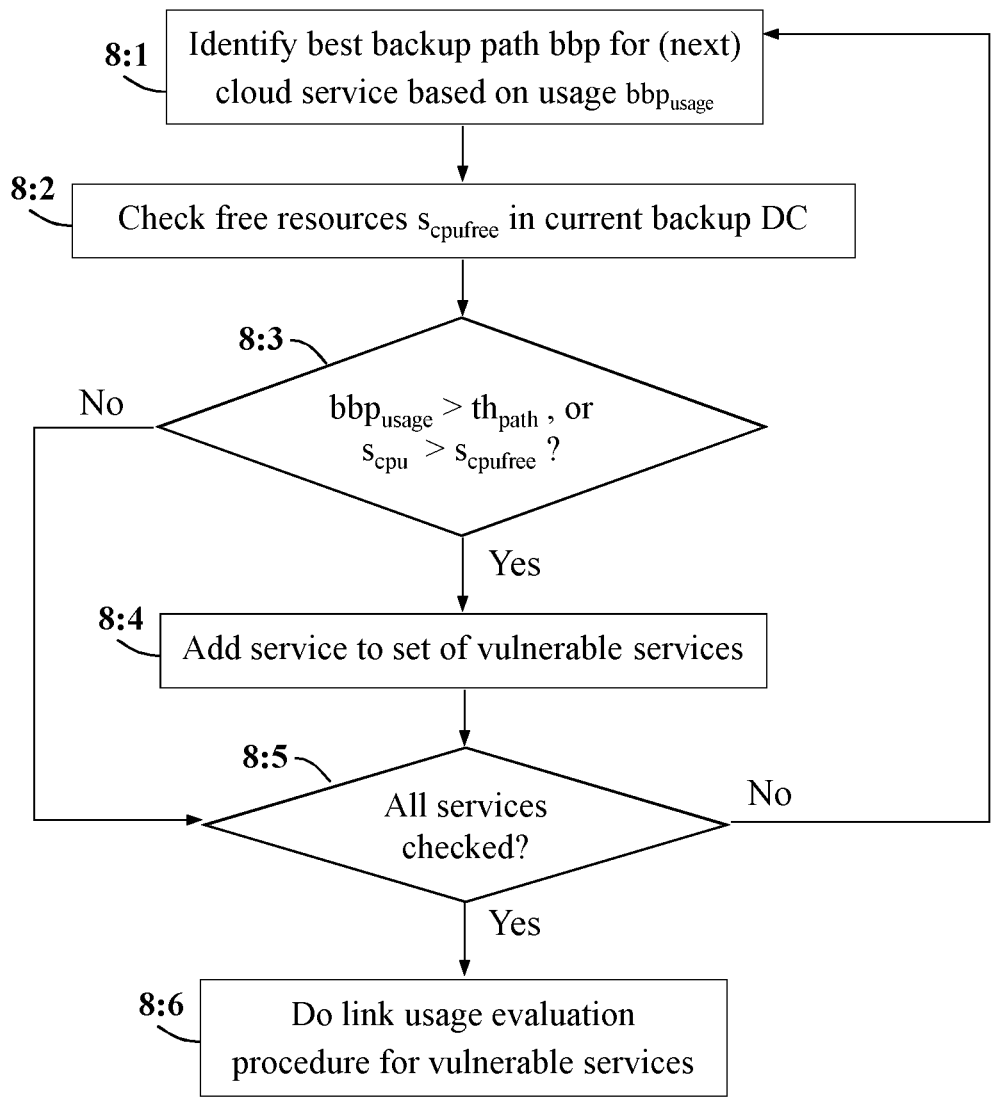
FIG. 8 is a flow chart illustrating yet another example procedure in a control node of how action 6:4 in FIG. 6 may be performed in more detail, according to further possible embodiments.

In the case of selecting the second backup data center 312 as above, another example embodiment may be that the usage of links between the source node 306 and the second backup data center 312 is evaluated when determining that the cloud service is "vulnerable". The cloud service may be determined to be vulnerable by either detecting that usage of links in at least said predefined number of potential communication paths between the source node 306 and the first backup data center 310 exceeds the second link usage threshold, or by detecting that the first backup data center 310 has not sufficient free processing resources needed for executing the cloud service. Hence, a cloud service can be considered to be vulnerable if there are not enough connectivity resources to the current backup data center, and/or if the current backup data center does not have enough free processing resources, to ensure non-delayed or non-hindered communication of service data. An example of how such vulnerable cloud services could be identified will be described below with reference to the flow chart in FIG. 8.

It has been described above how the first and second backup data centers 310 and 312, respectively, may be selected depending on the usage of links in communication paths to the source node 306. In this selection process, a number of backup data center candidates may be evaluated and the "best" data center, in terms of link usage and/or resource availability, may then be selected to be the "current" backup data center. The above-described embodiments for evaluating and selecting the backup data centers 310 and 312, respectively, may thus be made to ensure non-delayed or non-hindered communication of service data, in case it would be necessary to recover the cloud service in the currently appointed backup data center which could be either 310 or 312.

However, it may sometimes not be necessary to perform the above evaluation(s) when the traffic load in the network is generally low, making it unlikely that link usage in any communication path is high so as to delay or hinder the communication of service data. In another example embodiment, one or more backup data center candidates may be evaluated when a triggering condition is met in the communications network, said triggering condition requiring that link usage in at least a predefined number of links in the communications network, denoted "$th_{links}$", exceeds a bottleneck threshold denoted "$th_{usage}$". An example of how this could be done will be described below with reference to the flow chart in FIG. 7.

Figure 4:
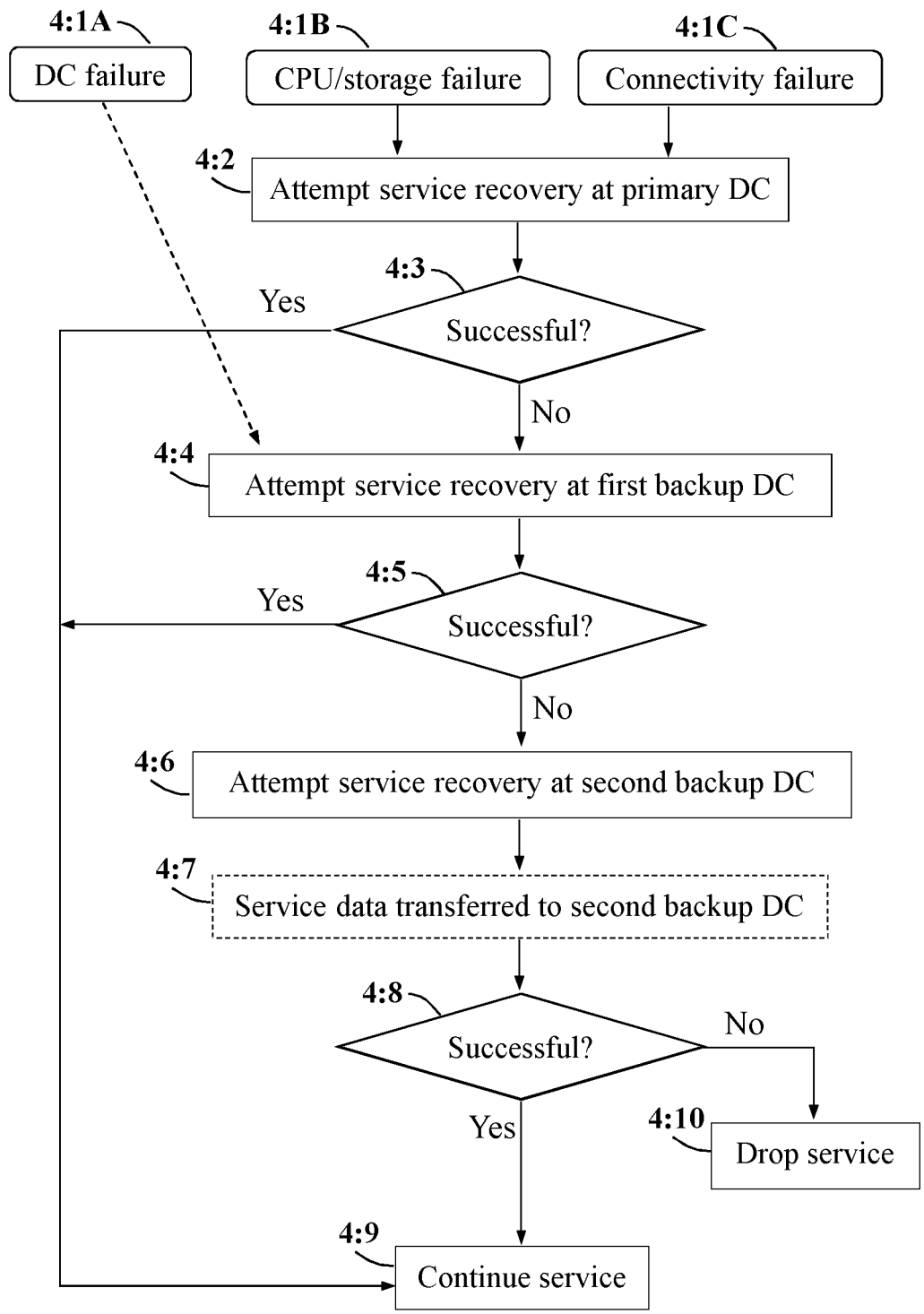
FIG. 4 is a flow chart illustrating an example procedure where the solution can be used by employing a control node, according to further possible embodiments.

An example of handling a cloud service executed for the client in a primary data center is subjected to some failure at the primary data center, will now be described with reference to the flow chart in FIG. 4. Reference will also be made to FIGS. 5A-5D which illustrate the communications network of FIG. 3 at different situations that may occur depending on the procedure of FIG. 4. In FIGS. 5A-5D the client's source node is denoted 306 and the primary data center is denoted 308 and a communication path comprising a link between 306 and 308 is initially used for communicating service data. FIG. 4 illustrates some different alternative procedures depending on whether some of the actions of FIG. 2 are implemented.

FIG. 4 illustrates three possible causes for failed service delivery using the primary data center 308, including alternative 4:1A: failure of the entire primary data center 308, alternative 4:1B: failure of some processing (CPU) and/or storage resource at the primary data center 308, and alternative 4:1C: failure of a used link to the primary data center 308, referred to as connectivity failure. FIGS. 5A-5D illustrate that the used link between 306 and 308 is disrupted which in this case is the cause for a connectivity failure, i.e. alternative 4:1C, as indicated by a dashed arrow. If either of alternatives 4:1B and 4:1C occurs, it may be possible to attempt service recovery "locally" at the primary data center 308 as shown by an action 4:2, e.g. by using alternative CPU/storage or connectivity resources that might be available to the primary data center 308.

Figure 5A:
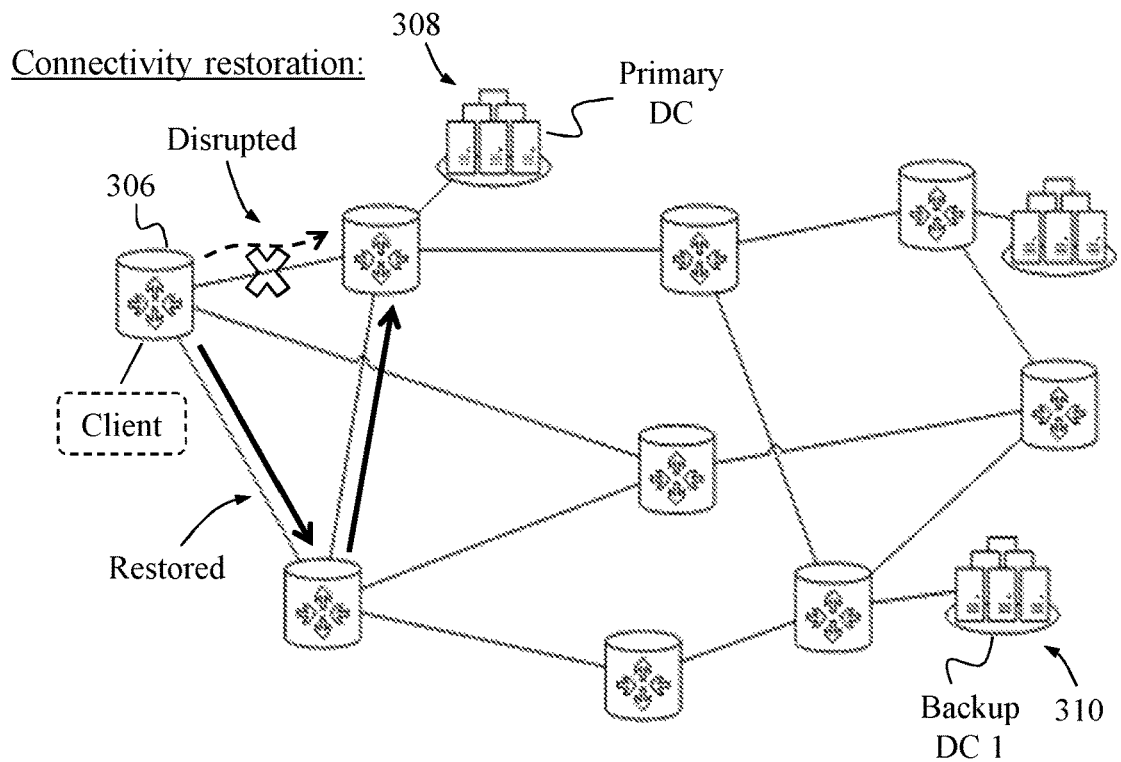
FIGS. 5A-5D illustrate different scenarios in the procedure of FIG. 4, according to further possible embodiments.

If this attempt is found to be successful at action 4:3, the service is continued according to an action 4:9, in this case in the primary data center 308. FIG. 5A illustrates that an alternative path to the primary data center 308 not including the disrupted link indicated by a dashed arrow can be used to overcome the connectivity failure of the originally used path, where the new path is indicated by two thick arrows in the figure. This scenario can be referred to as "Connectivity restoration". If the service recovery at the primary data center 308 is not successful or possible at 4:3, it may be possible instead to attempt service recovery at a first backup data center 310, as shown by an action 4:4. It has been described above how a first backup data center may be selected and that the used service data is proactively saved therein in advance, i.e. prior to the connectivity failure. It should be noted that if the entire primary data center 308 has failed as of alternative 4:1A above, there is no point in attempting the above local recovery of action 4:2 and FIG. 5A and the procedure may in this case start directly at action 4:4 by attempting service recovery at the first backup data center 310, as indicated by the dashed arrow from 4:1A.

Figure 5B:
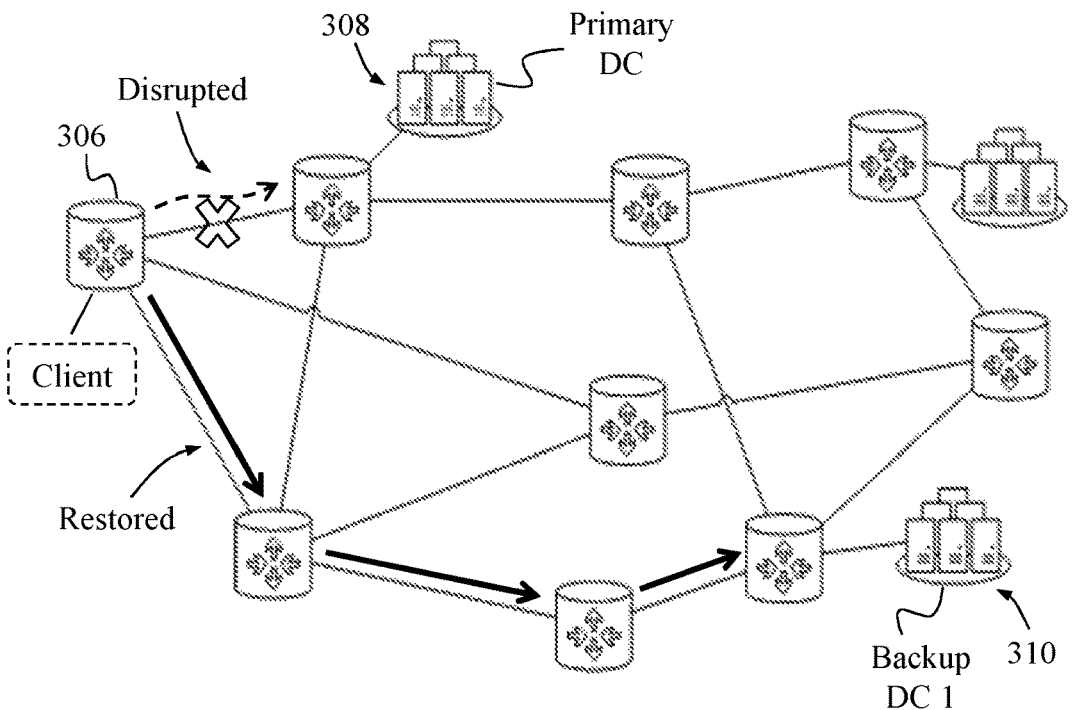

If this attempt is found to be successful at action 4:5, the service can be continued as of action 4:9, in this case in the first backup data center 310. FIG. 5B illustrates that an alternative path to the first backup data center 310 can be used to overcome the connectivity failure of the originally used path indicated by a dashed arrow, where the communication path to the first backup data center 310 is indicated by three thick arrows in the figure. This scenario can be referred to as "Connectivity+CPU restoration". If the service recovery at the first backup data center 310 is not successful or possible at 4:5, it may further be possible to attempt service recovery at a second backup data center 312, as shown by an action 4:6. Another action 4:7 illustrates schematically that the used service data has in this case been proactively transferred to the second backup data center 312 prior to the connectivity failure, e.g. according to some of the embodiments described above.

Figure 5C:
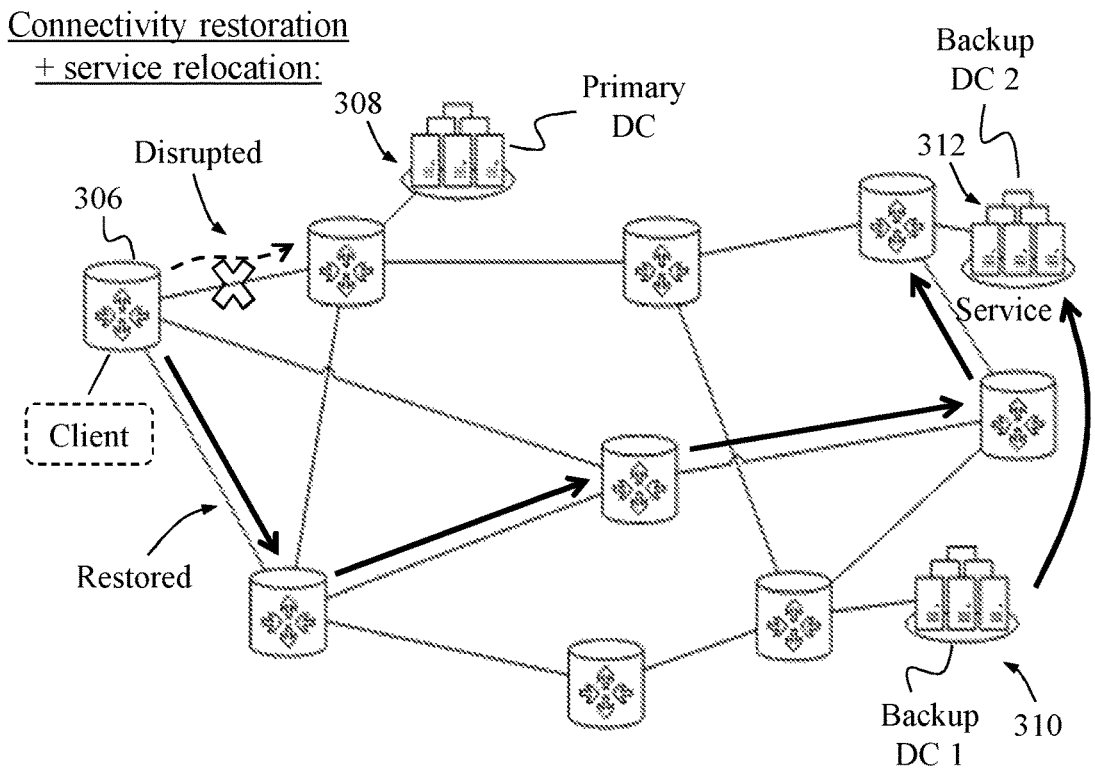
Figure 5D:
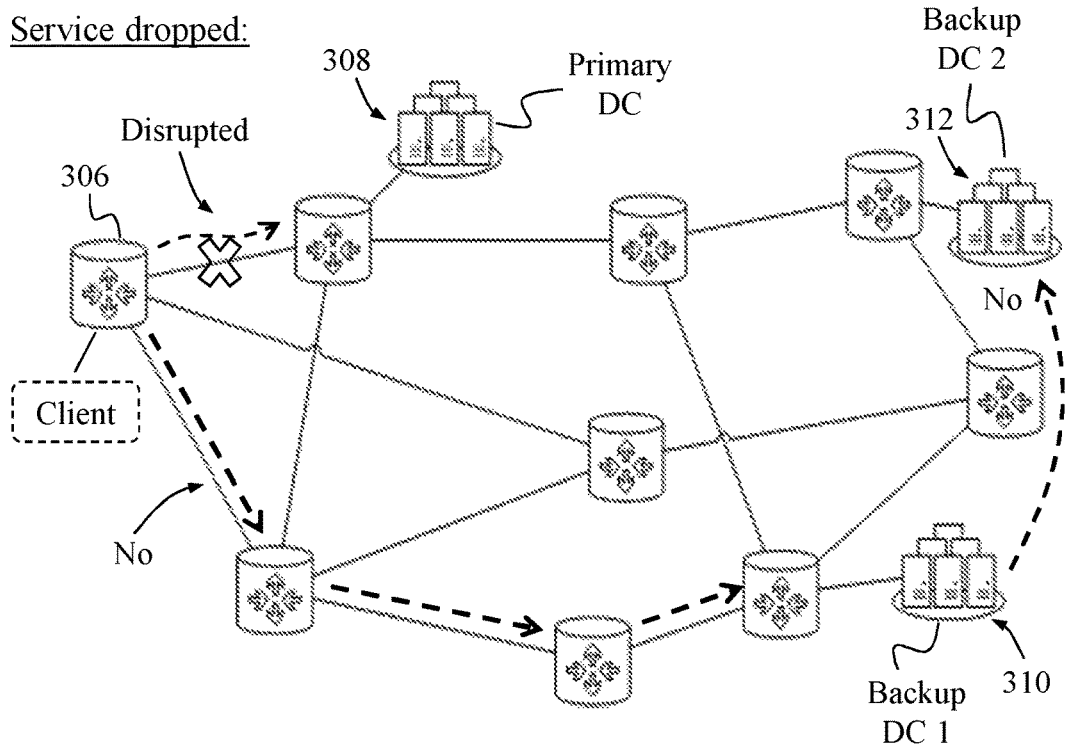

If this attempt is found to be successful at action 4:8, the service can be continued according to action 4:9 using the second backup data center 312. FIG. 5C illustrates that an alternative path to the second backup data center 312 can be used to overcome the connectivity failure of the originally used path, where the communication path to the second backup data center 312 is indicated by four thick arrows and the relocation of service data is indicated by a curved arrow. This scenario can be referred to as "Connectivity restoration+service relocation". If the service recovery at the second backup data center 310 is not successful or possible at 4:7, another action 4:10 illustrates that the service is finally dropped since all recovery alternatives have been tested. This scenario is illustrated in FIG. 5D where unsuccessful attempts to establish an alternative path and/or to relocate the service data are illustrated by dashed arrows.

Although FIG. 4 has been described in terms of a single cloud service executed for a client, it should be understood that the procedures therein are applicable for any number of services executed for any number of clients. For example, the checking whether attempts for service recovery have been successful or not at 4:3, 4:5 and 4:7, respectively, may be modified to check whether all remaining services not yet recovered previously have been recovered successfully, and any further attempt for service recovery is then made for any not yet recovered services. Once all cloud services have been subjected to the above-described restoration possibilities, the procedure may end at 4:9 or 4:10.

Figure 6:
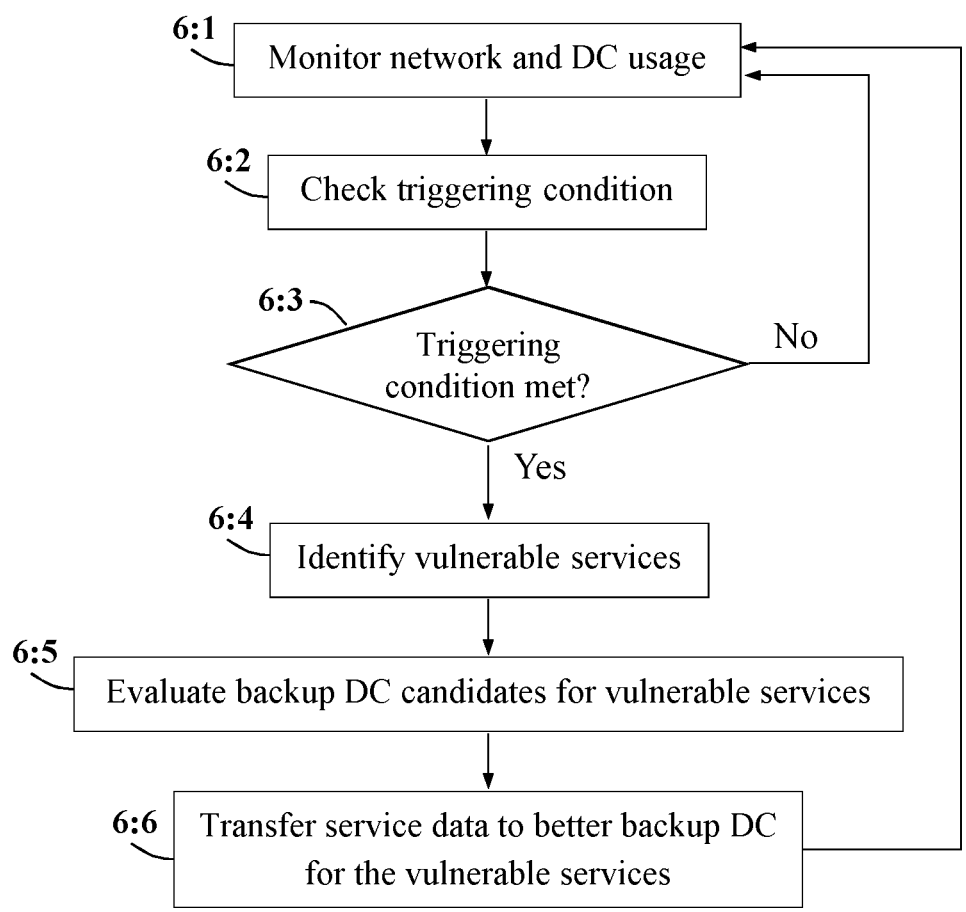
FIG. 6 is a flow chart illustrating another example procedure in a control node where the solution can be used, according to further possible embodiments.

Another example of how cloud services may be generally handled when implementing one or more of the above-described embodiments, will now be described with reference to the flow chart in FIG. 6, and sometimes also referring to the network scenario in FIG. 3. As in the forgoing examples, it is assumed that the control node 300 is operative to manage cloud resources in the communications network for clients initially served by a primary data center holding service data that may have to be transmitted to source nodes during execution of such cloud services.

It was mentioned above that the process of evaluating candidates for backup data centers may be initiated provided that a triggering condition related to link usage is met in the communications network. It may thus be assumed that when the general usage of links in the network is below a certain level, it is not necessary to conduct such evaluations. A first action 6:1 illustrates that the control node 300 monitors the communications network with respect to the general link usage therein, which may be assisted by obtaining link usage information from the above-described network controller 302.

In a next action 6:2, the control node 300 checks the above triggering condition which requires that at least a predefined number of links in the communications network have a link usage above a bottleneck threshold "$th_{usage}$", which would thus indicate a relatively high load on the communication links generally in the network. An example of how the triggering condition could be checked will be described in more detail below with reference to the flow chart in FIG. 7. If it is found that the triggering condition is met in a next action 6:3, the control node 300 proceeds to perform evaluation of whether any service data needs to be transferred to a better, i.e. more reliable and sustainable, backup data center to ensure survivability of the services, as follows. If the triggering condition is not met in action 6:3, the control node 300 may return to action 6:1 and continue monitoring the link usage, e.g. on a regular basis.

Otherwise in a next action 6:4, the control node 300 starts this evaluation of backup data centers by identifying any ongoing vulnerable cloud services, which are considered to be vulnerable in the sense of having insufficient connectivity resources to the current backup data center, and/or not having enough free processing resources in the currently appointed backup data center. Both are necessary to ensure non-delayed or non-hindered communication of service data, if it would be necessary to recover the service in the current backup data center. An example of how such vulnerable cloud services could be identified will be described below with reference to the flow chart in FIG. 8. The identified vulnerable cloud services may be registered in a list or the like for further treatment.

In a next action 6:5, the control node 300 evaluates one or more backup data center candidates for each identified vulnerable cloud service. In this action, it is thus determined, for each service, if there is any backup data center candidate that has enough processing and storage resources to handle the ongoing cloud service, and also connectivity resources that can provide a "better" communication path between the source node and the backup data center, which is dependent on the link usage in the communication path. It is assumed that the control node 300 identifies a backup data center candidate that is better than the currently appointed backup data center for at least some of the vulnerable cloud services, so that a change of backup data center is motivated for those services.

In a next action 6:6, the control node 300 therefore transfers service data from a currently appointed backup data center to a new and better backup data center for the vulnerable cloud services. An example of how such a transfer of service data from a first backup data center to a second backup data center may be done has been described above with reference to action 206.

Figure 7:
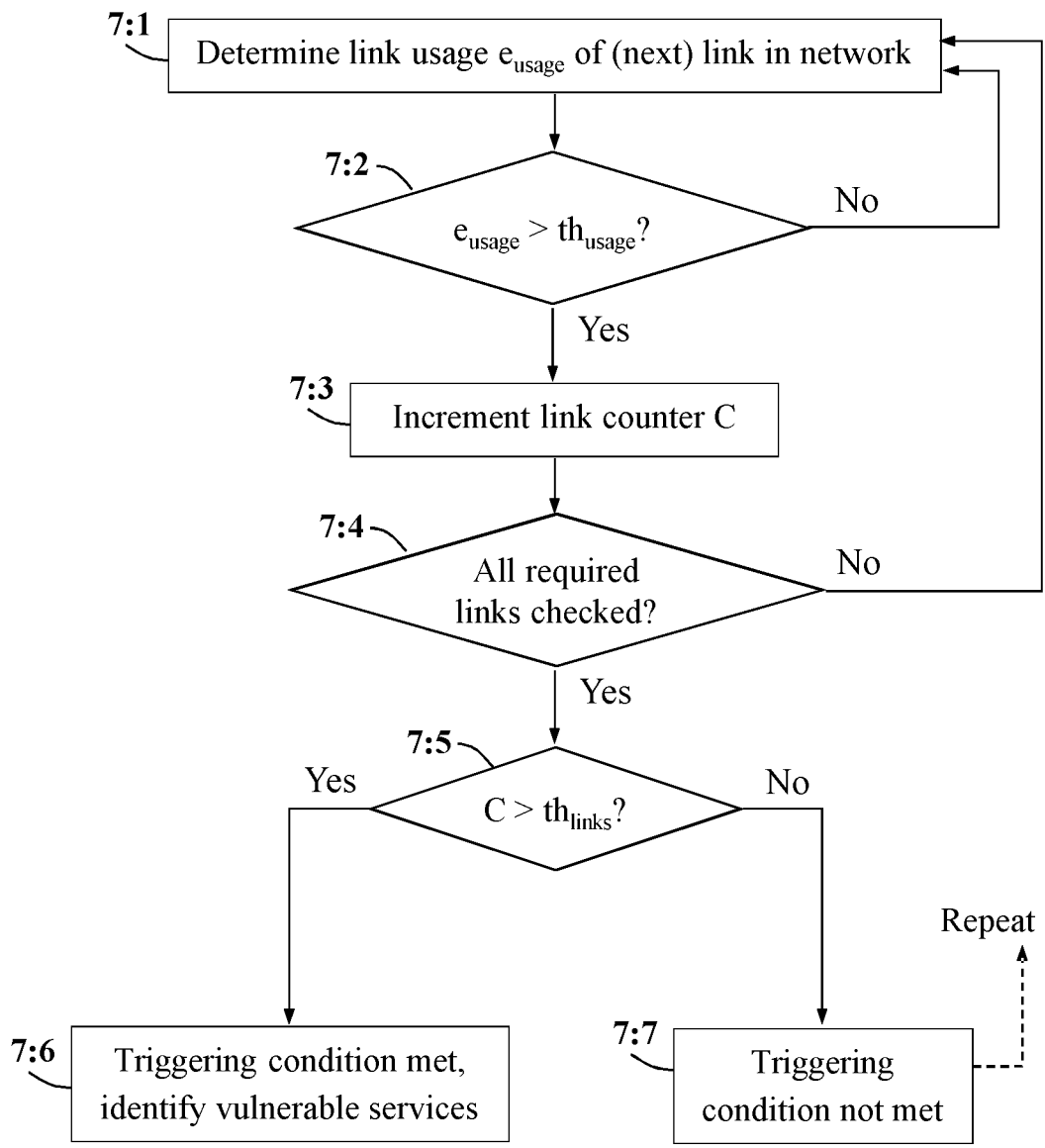
FIG. 7 is a flow chart illustrating another example procedure in a control node of how action 6:2 in FIG. 6 may be performed in more detail, according to further possible embodiments.

An example of how the above actions 6:2 and 6:3 may be performed in more detail, will now be described with reference to the flow chart in FIG. 7, sometimes also referring to the network scenario in FIG. 3. In this procedure, the control node 300 basically counts how many links there are in the network that has a link usage above a bottleneck threshold, and decides to check if there are any vulnerable services for which evaluation of backup data center candidates needs to be performed as of FIG. 6, if the number of such links exceeds a predetermined number.

A first action 7:1 illustrates that the control node 300 determines the link usage "$e_{usage}$" for a link in the network. It is then checked in a next action 7:2 if that link usage exceeds a predefined bottleneck threshold "$th_{usage}$". If not, the link usage $e_{usage}$ of a next link is determined by returning to action 7:1.

If $e_{usage} > th_{usage}$ in action 7:2, the control node 300 increments a link counter C in a next action 7:3.

In a next action 7:4, the control node 300 determines whether all links have been checked according to actions 7:1, 7:2, 7:3. It may be sufficient that a certain number of "required" links in the network, if not every single link of the network, are checked. If not, the next link is checked by returning to action 7:1. Each time a link is found in which $e_{usage} > th_{usage}$, the link counter C is incremented.

If all required links have been checked in action 7:4, the control node 300 determines whether the incremented link counter C exceeds a predefined number "$th_{links}$" or not, in another action 7:5. If so, the control node 300 concludes that the triggering condition, as of the above actions 6:2-6:3, has been met and proceeds to perform the above-described search for vulnerable services in a further action 7:6. On the other hand, if it is found in action 7:5 that the link counter C does not exceed "$th_{links}$", it is concluded that the triggering condition is not met in an action 7:7 which means basically that the current traffic load in the network does not warrant any search for vulnerable services. The procedure of monitoring link usage in the network may be repeated by returning to action 7:1.

It was mentioned above that evaluation of the usage of links between the source node 306 and the second backup data center 312 may be performed for a cloud service if it is determined to be "vulnerable", which relates to action 6:4 above. An example of how action 6:4 may be performed in more detail for identifying vulnerable services, will now be described with reference to the flow chart in FIG. 8, sometimes also referring to the network scenario in FIG. 3. The ongoing cloud services may be investigated in this respect one by one as follows.

Basically in this procedure, a cloud service is considered vulnerable if it is unlikely or even impossible to use a currently appointed backup data center for executing the service due to high link usage of the potential communication paths between the source node and that backup data center, and/or due to insufficient free processing resources in the current backup data center. A first action 8:1 illustrates that the control node 300 identifies the best backup path "bbp" for a cloud service that is being evaluated, based on link usage in that path, denoted "$bbp_{usage}$". The term "best backup path" indicates a potential communication path that has the lowest link usage among a number of potential communication paths between the source node and the backup data center. Alternatively, it may be sufficient to identify any potential communication path that appears to have low enough link usage. In some cases, there may be only one possible communication paths which can thus be identified as the best backup path bbp.

In a next action 8:2, the control node 300 checks how much free, i.e. unoccupied/unreserved, processing resources there is in the current backup data center, which is denoted "$s_{cpufree}$".

In a next action 8:3, the control node 300 checks a "vulnerability condition" by determining whether the link usage in the best path, "$bbp_{usage}$", exceeds the second link usage threshold, denoted "$th_{path}$". Checking the vulnerability condition also includes determining whether the current backup data center has sufficient free processing and storage resources needed for executing the cloud service. The amount of processing and storage resources needed for executing the cloud service is denoted "$s_{cpu}$". It is thus both checked whether $bbp_{usage}$ exceeds $th_{path}$ and whether $s_{cpu}$ exceeds $s_{cpufree}$. If at least one of these is true, there is a considerable risk that the service cannot be recovered successfully in the current backup data center in case of failure at the primary data center, and the service is consequently considered to be vulnerable. In that case, the cloud service is added to a set of vulnerable services, in an action 8:4.

It is then checked whether all cloud services have been checked with respect to the above vulnerability condition as of action 8:3, in another action 8:5. If not the process returns to action 8:1 for evaluating the next cloud service according to the above-described actions. If the evaluated cloud service is not vulnerable in action 8:3, action 8:4 will not be performed but action 8:5 is still performed as described above. When all cloud services have been checked with respect to vulnerability, the control node 300 proceeds to action 8:6 and does the link evaluation procedure for the set of vulnerable cloud services accumulated as of action 8:4, i.e. by performing the above-described action 6:5 and 6:6.

In more detail, once the set of vulnerable services is completed as of action 8:4, the control node 300 decides if and where the service data of the vulnerable services should be migrated to a new backup data center. This may be done as follows. For each vulnerable service, all possible candidate backup data centers that can be used to store the service data of that service may be checked. A candidate backup data center may be used as an alternative to host storage backup resources if, and only if, all the following conditions are met: (1) the new backup data center can be reached from the service source node with a path whose max link occupancy is below a given threshold, (2) the new backup data center has enough storage and CPU resources to accommodate the service needs, and (3) accommodating this cloud service in the new backup data center will not bring the overall usage of resources over a pre-defined resource usage threshold. This last condition may be enforced to avoid having cloud services that are migrated back and forth continuously. In case more than one candidate backup data center is identified, the procedure may use a "tie breaking policy", meaning that the data center that can be reached using a path that shows the lowest vales of the max link usage, is chosen to be the new backup data center.

When a new data center is selected to host the backup storage of a service, this service data is migrated to the new backup data center location. If for a given service it is not possible to identify a better data center for hosting the backup storage units, no reconfiguration takes place. Each cloud service to be migrated may first have its service data moved from the old backup data center location to the new one. Then, the synchronization process between the primary DC and the backup data center is updated to reflect the change in the backup location. This may be done to ensure consistency between the working primary and backup data centers.

Figure 9:
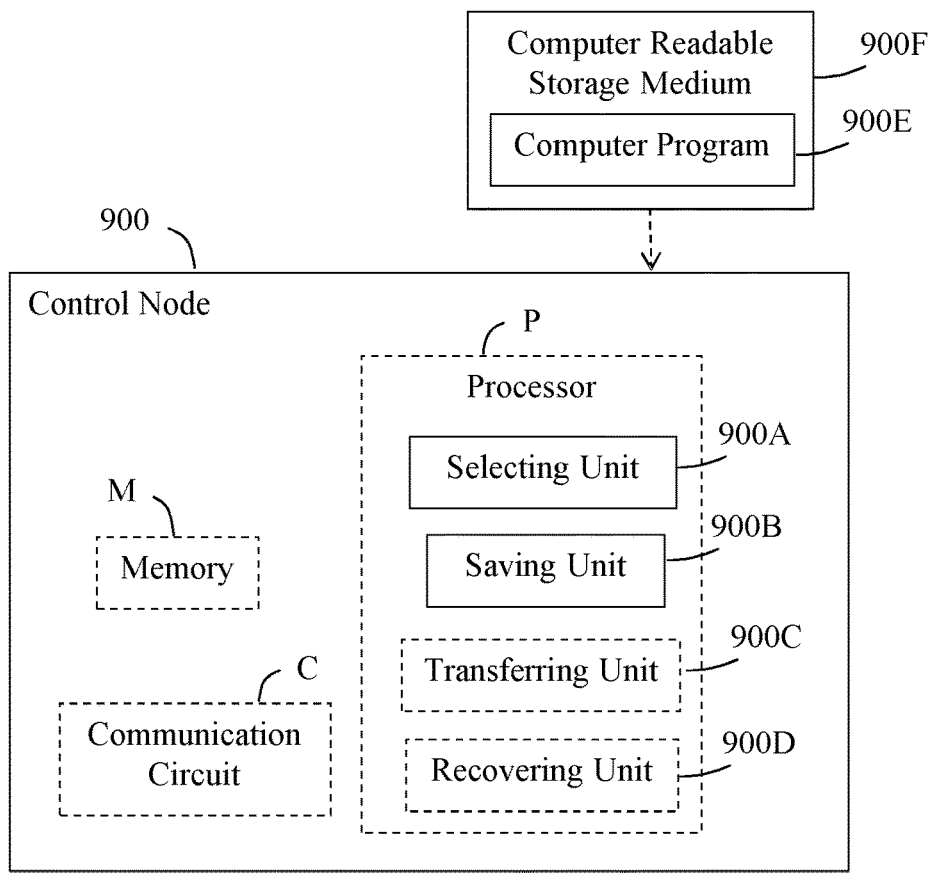
FIG. 9 is a block diagram illustrating how a control node may be configured, according to further possible embodiments.

The block diagram in FIG. 9 illustrates a detailed but non-limiting example of how a control node 900 may be structured to bring about the above-described solution and embodiments thereof. The control node 900 may be configured to operate according to any of the examples and embodiments of employing the solution as described above, where appropriate, and as follows. The control node 900 is shown to comprise a processor P and a memory M, said memory comprising instructions executable by said processor P whereby the control node 900 is operable as described herein. The control node 900 also comprises a communication circuit C with suitable equipment for receiving and transmitting signals in the manner described herein.

The communication circuit C may be configured for communication with a network controller and a cloud controller using suitable protocols depending on the implementation. The solution and embodiments herein are thus not limited to using any specific types of networks, technology or protocols for communication.

The control node 900 is operable to perform at least some of the actions 200-208 in FIG. 2, and optionally also at least some of the actions described above for FIGS. 4, 6-8. The control node 900 is arranged or configured to select a first backup data center having free processing and storage resources for the cloud service, based on usage of links between a source node associated with the client and the first backup data center. This operation may be performed by a selecting unit 900A in the control node 900, e.g. in the manner described for action 202 above.

The control node 900 is also configured to save said service data in the first backup data center, thereby enabling the cloud service to be recovered in the first backup data center in case of service failure at the primary data center. This operation may be performed by a saving unit 900B in the control node 900, e.g. as described for action 204 above.

The control node 900 may also be configured to transfer the saved service data from the first backup data center to the above-described second backup data center, when detecting that usage of links in at least a predefined number of potential communication paths between the source node and the first backup data center exceeds the above-described second link usage threshold. This operation may be performed by a transferring unit 900C in the control node 900, e.g. as described above for action 206.

The control node 900 may also be configured to recover the ongoing cloud service in the first or second backup center where the service data is currently held, in case of failure at the primary data center. This operation may be performed by a recovering unit 900D in the control node 900, e.g. as described above for action 208.

It should be noted that FIG. 9 illustrates various functional units or modules in the control node 900, and the skilled person is able to implement these functional units or modules in practice using suitable software and hardware. Thus, the solution is generally not limited to the shown structures of the control node 900, and the functional units or modules 900A-D therein may be configured to operate according to any of the features and embodiments described in this disclosure, where appropriate.

The functional units or modules 900A-D described above can be implemented in the control node 900 by means of suitable hardware and program modules of a computer program comprising code means which, when run by the processor P causes the control node 900 to perform at least some of the above-described actions and procedures.

Figure 9A:
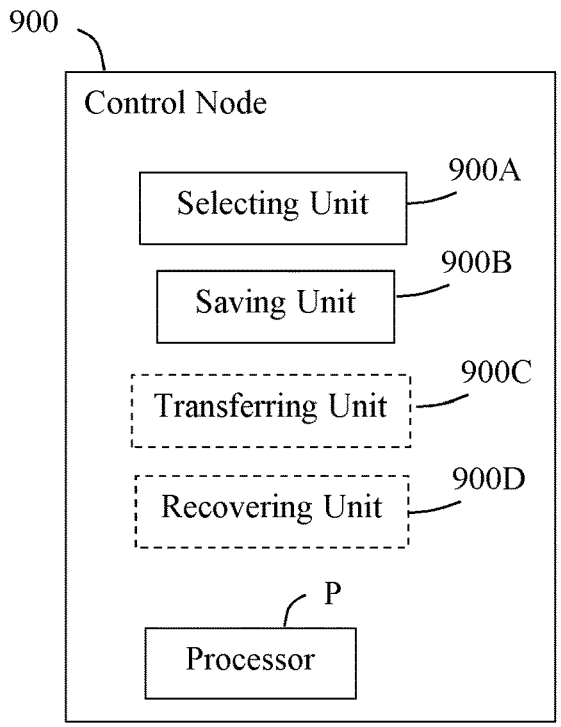
FIG. 9A is a block diagram illustrating another example of how the control node may be configured, according to further possible embodiments.

Another example of how the control node 900 may be configured is schematically shown in the block diagram of FIG. 9A. In this example, the control node 900 comprises the functional units or modules 900A-900D and a processor P, the units or modules 900A-900D being configured to operate in the manner described above e.g. with reference to FIG. 2.

In either FIG. 9 or FIG. 9A, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

A computer program 900E is also provided comprising instructions which, when executed on at least one processor, cause the at least one processor to carry out either of the methods described above. A carrier is further provided that contains the above computer program 900E, wherein the carrier comprises an electronic signal, an optical signal, a radio signal, or a computer readable storage medium 900F, the latter shown in FIG. 9. For example, the computer program 900E may be stored on the computer readable storage medium 900F in the form of computer program modules or the like. The memory M may be a flash memory, a Random-Access Memory (RAM), a Read-Only Memory (ROM), an Electrically Erasable Programmable ROM (EE-PROM) or hard drive storage (HDD), and the program modules could in alternative embodiments be distributed on different computer program products in the form of memories within the control node 900.

While the solution has been described with reference to specific exemplifying embodiments, the description is generally only intended to illustrate the inventive concept and should not be taken as limiting the scope of the solution. For example, the terms "control node", "cloud resources", "service data", "data center", "cloud service", "source node" and "service failure" have been used throughout this disclosure, although any other corresponding entities, functions, and/or parameters could also be used having the features and characteristics described here. The solution is defined by the appended claims.

The invention claimed is:

1. A method performed by a control node for managing cloud resources in a communications network for a client being served by a primary data center holding service data associated with a cloud service being executed for the client in the primary data center, the method comprising:
   selecting a first backup data center having free processing and storage resources for the cloud service, based on usage of links between a source node associated with the client and the first backup data center;
   saving said service data in the first backup data center, thereby enabling the cloud service to be recovered in the first backup data center in case of service failure at the primary data center;
   evaluating link usage of links in the communications network;
   in response to meeting a triggering condition requiring that the link usage in at least a predefined number of links in the communication network exceeds a bottleneck threshold, evaluating one or more backup data center candidates; and
   selecting one of the one or more backup data center candidates, based on the evaluating the one or more backup data center candidates, as a second backup data center for the service data.

2. The method according to claim 1, wherein the first backup data center is selected when detecting that usage of links in at least one potential communication path between the source node and the first backup data center does not exceed a first link usage threshold.

3. The method according to claim 2, further comprising:
   transferring the saved service data from the first backup data center to the second backup data center when detecting that link usage of links between the source node and the first backup data center exceeds a second link usage threshold, thereby enabling the cloud service to be recovered in the second backup data center in case of service failure at the primary data center.

4. The method according to claim 3, wherein the second backup data center is selected when the second backup data center has free processing and storage resources needed for executing the cloud service.

5. The method according to claim 4, wherein the usage of links between the source node and the second backup data center is evaluated when detecting that the first backup data center has not sufficient free processing resources needed for executing the cloud service.

6. A control node arranged to manage cloud resources in a communications network for a client being served by a primary data center holding service data associated with a cloud service being executed for the client in the primary data center, the control node comprising:
   at least one processor; and
   a memory containing instructions which, when executed on the at least one processor, cause the control node to perform operations to:
      select a first backup data center having free processing and storage resources for the cloud service, based on usage of links between a source node associated with the client and the first backup data center;
      save said service data in the first backup data center, thereby enabling the cloud service to be recovered in the first backup data center in case of service failure at the primary data center;
      evaluate link usage of links in the communications network;
      in response to meeting a triggering condition requiring that the link usage in at least a predefined number of links in the communication network exceeds a bottleneck threshold, evaluate one or more backup data center candidates; and
      select one of the one or more backup data center candidates, based on the evaluated one or more backup data center candidates, as a second backup data center for the service data.

7. The control node according to claim 6, wherein the first backup data center is selected when detecting that usage of links in at least one potential communication path between the source node and the first backup data center does not exceed a first link usage threshold.

8. The control node according to claim 7, wherein the instructions cause the control node to perform further operations to transfer the saved service data from the first backup data center to the second backup data center when detecting that link usage of links between the source node and the first backup data center exceeds a second link usage threshold, thereby enabling the cloud service to be recovered in the second backup data center in case of service failure at the primary data center.

9. The control node according to claim 8, wherein the instructions cause the control node to perform further operations to select the second backup data center when the second backup data center has free processing and storage resources needed for executing the cloud service.

10. The control node according to claim 9, wherein the instructions cause the control node to perform further operations to evaluate the usage of links between the source node and the second backup data center when detecting that the first backup data center has not sufficient free processing and storage resources needed for executing the cloud service.

11. A non-transitory machine readable storage medium comprising instructions which, when executed on at least one processor, are capable of causing a control node, for managing cloud resources in a communications network for a client being served by a primary data center holding service data associated with a cloud service being executed for the client in the primary data center, to perform operations comprising:
selecting a first backup data center having free processing and storage resources for the cloud service, based on usage of links between a source node associated with the client and the first backup data center;
saving said service data in the first backup data center, thereby enabling the cloud service to be recovered in the first backup data center in case of service failure at the primary data center;
evaluating link usage of links in the communications network;
in response to meeting a triggering condition requiring that the link usage in at least a predefined number of links in the communication network exceeds a bottleneck threshold, evaluating one or more backup data center candidates; and
selecting one of the one or more backup data center candidates, based on the evaluating the one or more backup data center candidates, as a second backup data center for the service data.

12. The non-transitory machine readable storage medium according to claim 11, wherein the instructions are capable of causing the first backup data center to be selected when detecting that usage of links in at least one potential communication path between the source node and the first backup data center does not exceed a first link usage threshold.

13. The non-transitory machine readable storage medium according to claim 12, wherein the instructions are capable of causing further operations comprising:
transferring the saved service data from the first backup data center to the second backup data center when detecting that link usage of links between the source node and the first backup data center exceeds a second link usage threshold, thereby enabling the cloud service to be recovered in the second backup data center in case of service failure at the primary data center.

14. The non-transitory machine readable storage medium according to claim 13, wherein the instructions are capable of causing the second backup data center to be selected when the second backup data center has free processing and storage resources needed for executing the cloud service.

15. The non-transitory machine readable storage medium according to claim 14, wherein the instructions are capable of causing the usage of links between the source node and the second backup data center to be evaluated when detecting that the first backup data center has not sufficient free processing resources needed for executing the cloud service.

* * * * *